(12) United States Patent
Ratliff et al.

(10) Patent No.: US 7,602,580 B1
(45) Date of Patent: Oct. 13, 2009

(54) COMMUTATIONAL RAMP LOADING APPARATUS AND METHOD

(75) Inventors: Ryan T. Ratliff, O'Fallon, MO (US); Prabhakar R. Pagilla, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 11/757,295

(22) Filed: Jun. 1, 2007

Related U.S. Application Data

(60) Provisional application No. 60/810,466, filed on Jun. 1, 2006.

(51) Int. Cl.
*G11B 5/596* (2006.01)
(52) U.S. Cl. ................................ 360/78.04; 360/75
(58) Field of Classification Search .................. None
See application file for complete search history.

(56) References Cited

U.S. PATENT DOCUMENTS

| | | | | |
|---|---|---|---|---|
| 5,455,728 A | * | 10/1995 | Edwards et al. | 360/256.2 |
| 5,581,424 A | * | 12/1996 | Dunfield et al. | 360/256.2 |
| 6,157,509 A | * | 12/2000 | Ratliff | 360/75 |
| 6,449,129 B1 | | 9/2002 | Macpherson et al. | |
| 6,483,667 B1 | | 11/2002 | Berg et al. | |
| 6,490,135 B1 | | 12/2002 | Sannino et al. | |
| 6,507,460 B2 | | 1/2003 | Fayeulle et al. | |
| 6,710,964 B1 | | 3/2004 | Rao et al. | |
| 6,714,377 B2 | | 3/2004 | Bement et al. | |
| 6,721,134 B1 | | 4/2004 | Pottebaum et al. | |
| 6,989,965 B2 | | 1/2006 | Mundt et al. | |
| 7,327,537 B1 | * | 2/2008 | Oveyssi | 360/264.7 |

* cited by examiner

*Primary Examiner*—Jason C Olson
(74) *Attorney, Agent, or Firm*—Fellers, Snider, Blankenship, Bailey & Tippens

(57) ABSTRACT

An apparatus and method for loading and offloading a read/write head from a load ramp onto a disc are disclosed. The apparatus includes at least a basedeck supporting a spindle motor with an attached disc and an actuator assembly with a read/write head configured for communication with the disc, and a load ramp positioned adjacent the disc and configured for receipt of the read/write head. The actuator assembly includes at least an actuator motor magnet mounted to said basedeck, an actuator body attached to the basedeck and providing a voice coil configured for interaction with the actuator motor magnet, and a bias feature secured to said actuator body and configured for communication with the motor magnet such that when the read/write head is parked on the load ramp, the bias feature mitigates an unintentional engagement of the read/write head with the disc.

8 Claims, 3 Drawing Sheets

COMMUTATIONAL RAMP LOADING APPARATUS AND METHOD

RELATED APPLICATIONS

This application claims priority to U.S. Provisional Patent Application No. 60/810,466 filed on Jun. 1, 2006, entitled "COMMUTATIONAL RAMP LOADING APPARATUS AND METHOD."

STATEMENT REGARDING FEDERALLY SPONSORED RESEARCH

The Government of the United States of America has certain rights in this invention pursuant to Grant No. CMS-9982071 awarded by National Science Foundation.

FIELD OF THE INVENTION

The claimed invention relates generally to the field of data storage device technology and more particularly, but not by way of limitation, to an inventive apparatus and method for loading and unloading read/write heads communicating with a disc of a disc drive.

BACKGROUND

Non-operational linear shocks can be catastrophic to disc drive reliability. A significant shock can cause damage to read/write heads and disc interface, ultimately resulting in failure. These shocks can occur during shipping and handling or after installation in computers and consumer electronic devices. A known protection method against shock dynamics is to off-load the read/write heads from a position adjacent the recording surface of the disc, and position the heads upon a load ramp, when the drive is non-operational, and reload the heads adjacent the recording surface to commence operation of the. This protection method is often referred to as "ramp-load" technology.

However, a number of implementations of ramp-load technology add costs to the voice coil motor of the drive in the form of added magnet and coil material, needed for control of the actuator during ramp loading and unloading procedures.

Accordingly, there is a need for an efficient and effective implementation of ramp-load technology.

SUMMARY OF THE INVENTION

In accordance with a preferred embodiment, a method and apparatus for loading and offloading a read/write head from a load ramp are provided. The apparatus preferably includes at least a basedeck supporting a spindle motor secured to the basedeck and providing a disc, a commutational actuator mounted to the basedeck and supporting a read/write head configured for communication with the disc, and a load ramp attached to the basedeck, adjacent the disc, and configured for receipt of the read/write when the spindle motor is powered down.

Preferably, the commutational actuator includes at least an actuator motor magnet mounted to the basedeck, an actuator body communicating with the basedeck and supporting a actuator coil configured for communication with the actuator motor magnet, and a bias feature secured to the actuator body and configured for communication with the motor magnet, wherein upon parking the read/write head onto the load ramp, the bias feature mitigates an unintentional movement of the read/write heads into adjacency with the disc.

The method is preferably practiced by steps that include at least establishing current, velocity, and position control loops for a coil active length of an actuator assembly of a data storage device, advancing the coil active length to into adjacency with a zero torque magnetic transition zone of an actuator motor magnet of said data storage device, utilizing the established control loops, and acquiring a final position control loop value upon entry into the zero torque magnetic transition zone. The method further preferably includes at least the additional steps of also acquiring a final velocity control loop value upon entry into the zero torque magnetic transition zone, maintaining the current control loop while ignoring position control loop values and velocity control loop values provided by the respective position and velocity control loops, while the coil active length advances through the zero torque magnetic transition zone, and reacquiring both a position control loop and a velocity control loop upon an exit of the coil active length from the zero torque magnetic transition zone utilizing said acquired final position and velocity values.

These and various other features and advantages, which characterize preferred embodiments of the present subject matter, will be apparent from reading the following detailed description of a preferred embodiment in conjunction with reviewing the associated drawings of a preferred embodiment.

DESCRIPTION OF PREFERRED EMBODIMENTS

Figure 1:
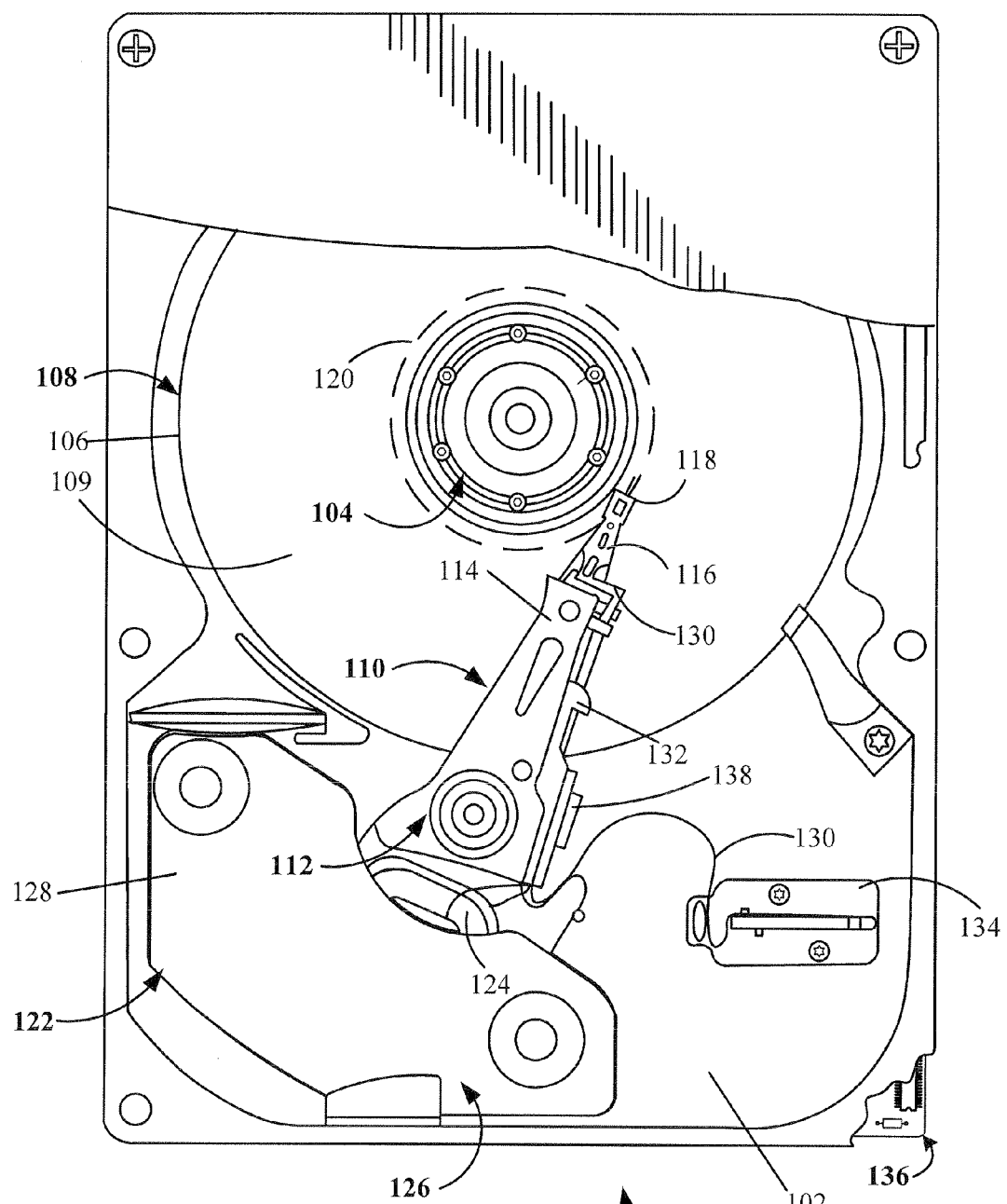
FIG. 1 is a top plan view of a preferred embodiment of the subject matter considered by the Applicant as their invention.

Preferably, an outcome of practicing embodiments of the present invention is a unique actuator system for a disc drive that provides both efficient and higher performance characteristics over nominal designs used in the industry today. Referring to the drawings in general, and more particularly to FIG. 1, shown therein is a top view of a disc drive 100, also referred to herein as a data storage device, constructed in accordance with a preferred embodiment of the present invention. Numerous details of and variations for the construction of the disc drive 100 are not included in the following description as such are well-known to those skilled in the art, and believed unnecessary for the purpose of describing the present invention.

The preferred embodiment disc drive 100 includes a basedeck 102 supporting various data storage device components, including a spindle motor assembly 104 that supports one or more axially aligned rotatable discs 106 forming a disc stack 108, each disc 106 having at least one, and usually two, recording surfaces 109.

Adjacent the disc stack 108 is a head stack assembly 110 (also referred to as an actuator assembly) that pivots about a bearing assembly 112 in a rotary fashion. The actuator assembly 110 includes an actuator arm 114 that supports a load arm 116, which in turn supports a read/write head 118 corresponding to the rotatable recording surface 109. The rotatable recording surface 109 is divided into concentric information tracks 120 (only one depicted) over which the read/write head 118 is positionably located. The information tracks 120 support head position control information previously written to embedded servo sectors (not separately depicted). Between the embedded servo sectors are data sectors (not separately depicted) used for storing information. The read/write head 118 includes a reader element (not separately shown) offset radially and laterally from a writer element (not separately shown). The writer element writes data to the concentric information tracks 120 during write operations of the disc drive 100, while the reader element controls the positioning of the read/write head 118 relative to the concentric information tracks 120 during operations of the disc drives 100.

The terms "servoing" and "position-controlling," as used herein, mean maintaining control of the read/write head 118 relative to the rotating recording surfaces 109 during operation of the disc drive 100. When positioning read/write head 118 to or on the information track 120, the actuator assembly 110 is controllably positioned by a voice coil motor assembly 122 (also referred to a primary actuator motor). The voice coil motor assembly 122 includes an actuator coil 124 immersed in a magnetic field generated by a magnet assembly 126. A pair of steel plates 128 (pole pieces) mounted above and below the actuator coil 124 provides a magnetically permeable flux path for a magnetic circuit of the voice coil motor 122. During operation of the disc drive 100, current passes through the actuator coil 124 forming an electromagnetic field, which interacts with the magnetic circuit of the voice coil motor 122, causing the actuator coil 124 to move relative to the magnet assembly 126. As the actuator coil 124 moves, the actuator assembly 110 pivots about the bearing assembly 112, causing the read/write head 118 to move over the rotatable recording surface 109, thereby allowing the read/write head 118 to interact with the information tracks 120 of the recording surfaces 109.

To provide the requisite electrical conduction paths between the read/write head 118 and data storage device read/write circuitry (not shown), read/write head wires (not shown) of the read/write head are affixed to a read/write flex circuit 130. The read/write flex circuit 130 is routed from the load arms 116 along the actuator arms 114 and into a flex circuit containment channel 132 and secured to a flex connector body 134. The flex connector body 134 supports the flex circuit 130 during passage through the basedeck 102 and into electrical communication with a printed circuit board assembly (PCBA) 136 mounted to the underside of the basedeck 102. The flex circuit containment channel 132 also supports read/write signal circuitry including preamplifier/driver (preamp) 138 used to condition read/write signals passed between the read/write circuitry and the read/write head 118. The printed circuit board assembly provides the data storage device read/write circuitry that controls the operation of the read/write head 118, as well as other interface and control circuitry for the disc drive 100.

Figure 2:
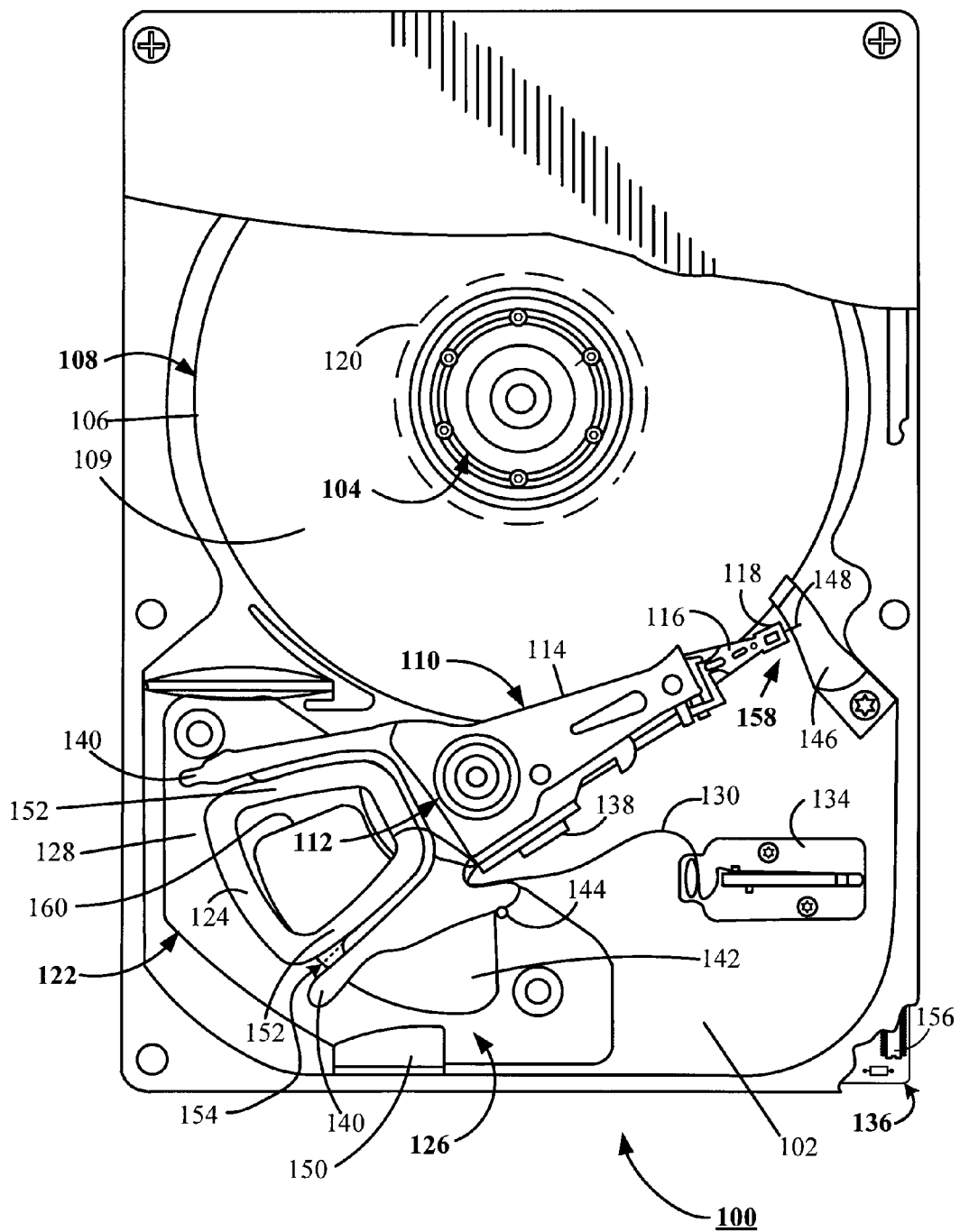
FIG. 2 is a top plan view of the preferred embodiment of the subject matter considered by the Applicant as their invention, illustrated with the top pole piece and associated magnet removed.

FIG. 2 shows the actuator assembly 110 further includes a coil support arm 140 supporting the actuator coil 124 in magnetic communication with at least one actuator motor magnet 142. The at least one actuator magnet 142 is supported by the pole piece 128. The coil support arm 140 further supports a bias feature 144. The bias feature 144 interacts magnetically with the actuator motor magnet 142 to mitigate an unintentional movement of the read/write heads 118 into contact with the discs 106 when the read/write heads 118 are placed in a parked position along a length of the load ramp 146 as shown in FIG. 1. In a preferred embodiment, the bias feature 144 is formed from a magnetically sympathetic material such as steel.

Also shown in the preferred embodiment of FIG. 2, is a lift tab 148 secured to the load arm 116, and a spacer 150, preferably formed from steel. The lift tab 148 interacts with the load ramp 146 during operations of loading and unloading the read/write head from interaction with the information tracks 120. Preferably, the spacer 150, positioned behind the actuator coil 124 and secured to the basedeck 102, enhances structural stability for the magnet assembly 126 while also providing an extra path for magnetic flux, which improves the efficiency of the magnetic circuit.

The preferred actuator coil 124, shown by FIG. 2, features a pair of coil active lengths 152. As seen by FIG. 2, at least one coil active length 152 travels over and through a zero torque magnetic transition zone 154, which presents an uncontrollable set in the state-space. To promote control of the actuator assembly 110, the preferred embodiment current, position, and velocity control loops established through use of a controller 156 of the PCBA 136, and is based on a feedback signal acquired from current applied to the coil active length 152.

To promote travel through the uncontrolled set, i.e., the zero torque magnetic transition zone 154, preferably the controller 156 is configured to acquire and save a final position value of the position control loop of the coil active length 152 upon an entry of the coil active length 152 into the zero torque magnetic transition zone 154. During passage of the coil active length 152 through the zero torque magnetic transition zone 154, position control loop values provided by the position control loop are ignored, while the current control loop continues to be utilized. Upon exit of the coil active length 152 from the zero torque magnetic transition zone 154, the saved final position value is utilized by the controller 156 as a basis to reacquire the position control loop.

Concurrent with the acquired and saved final position value, the controller 156 preferably acquires and saves a final velocity value of the velocity control loop of the coil active length 152 upon an entry of the coil active length 152 into the zero torque magnetic transition zone 154. During passage of the coil active length 152 through the zero torque magnetic transition zone 154, velocity control loop values provided by the position control loop are also ignored, while the current control loop continues to be utilized. Upon exit of the coil active length 152 from the zero torque magnetic transition zone 154, the saved final velocity value is utilized by the controller 156 as a basis to reacquire the velocity control loop.

When the specific direction of movement of the actuator assembly 110, is in a direction that results in placement of the read/write head 118 in a parked position 158 adjacent the load ramp 146, the coil active length 152 is preferably positioned beyond an edge 160 of the actuator motor magnet 142.

Figure 3:
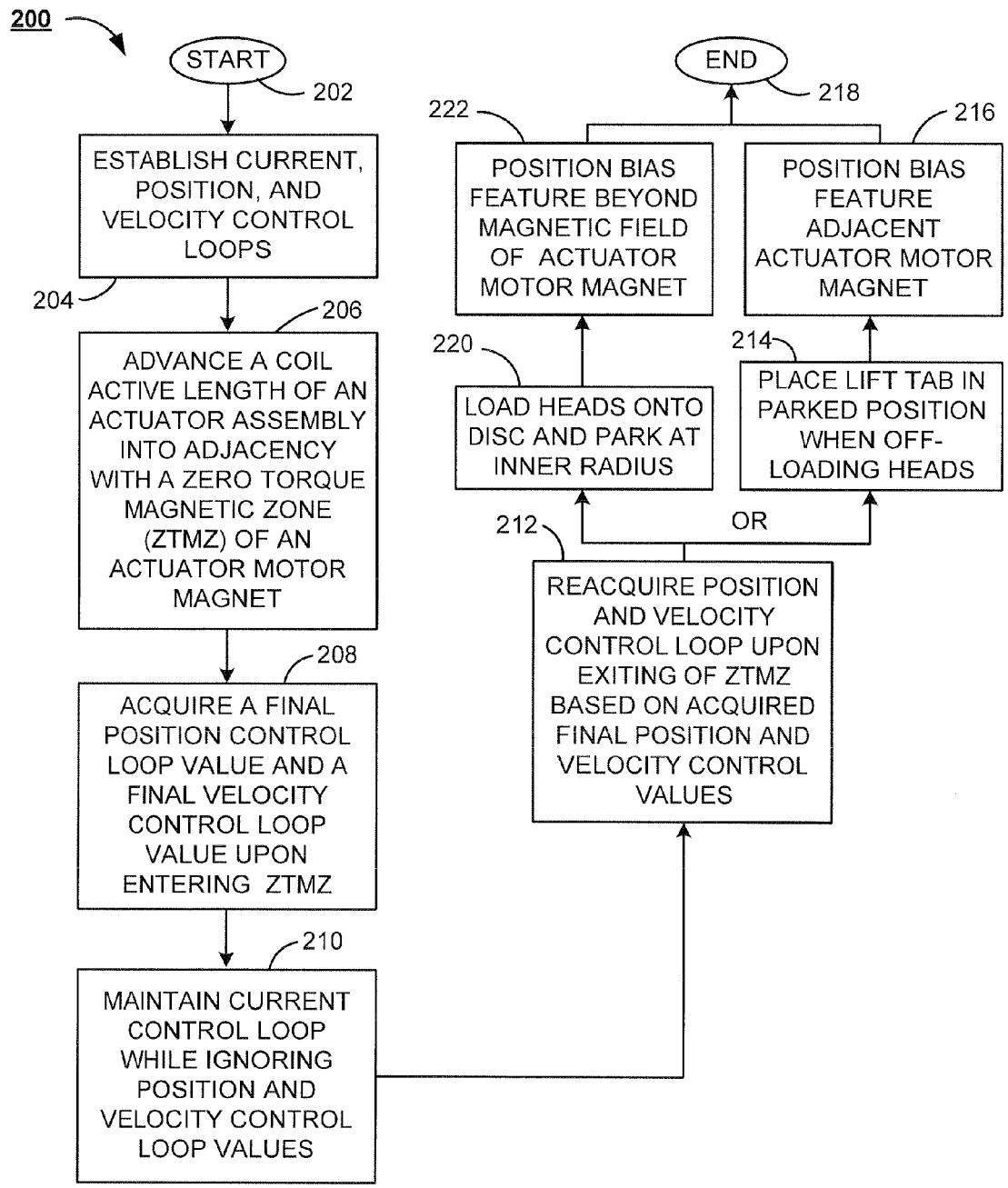
FIG. 3 shows a flow diagram of a method of practicing the subject matter considered by the Applicant as their invention.

A method 200 of practicing the present invention is shown by the flowchart of FIG. 3. The method 200 commences at start step 202, and continues to process step 204. At process step 204, current, velocity, and position control loops are established for a coil active length (such as 152) of an actuator assembly (such as 110) of a data storage device (such as 100). At process step 206, the coil active length is advanced to into adjacency with a zero torque magnetic transition zone (such as 154) as of an actuator motor magnet (such as 142) of the data storage device, through use of the established control loops.

Continuing with process step 208, a final position control loop value and a final velocity control loop value are each acquired upon entry into the zero torque magnetic transition zone. At process step 210, the current control loop is maintained while the position and velocity control loop values provided by their respective position control loops are ignored during passage of the coil active length advances through the zero torque magnetic transition zone. At process 212, position and velocity control loops are reacquired upon an exit of the coil active length from the zero torque magnetic transition zone through the utilization of the acquired final position and velocity values.

At process step 214, a lift tab (such as 148) of a load arm (such as 116) is placed into a parked position (such as 158), such that the lift tab is supported by the load ramp. At process step 216, a bias feature (such as 144) is positioned adjacent the actuator motor magnet while placing the lift tab into the parked position, and the process concludes at end process step 218. Alternatively, following process step 212, the process continues to process step 220 with loading the heads onto the disc and parking the heads at an inner radius of the disc. At process step 222, the bias feature is positioned beyond the magnetic field of the actuator motor magnet, and the process ends at process step 218.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of steps within the principles of the invention to the full extent indicated by the broad general meaning of the terms in which the appended claims are expressed. For example, the particular elements may vary depending on the particular application for the desired device, while maintaining the same functionality without departing from the spirit and scope of the invention.

What is claimed is:

1. A method by steps comprising:
    establishing current, velocity, and position control loops for a coil active length of an actuator assembly of a data storage device;
    advancing said coil active length into adjacency with a zero torque magnetic transition zone of an actuator motor magnet of said data storage device, utilizing said established control loops;
    acquiring a final position control loop value upon entry into said zero torque magnetic transition zone;
    maintaining said current control loop while ignoring position control loop values provided by said position control loop whilst said coil active length advances through said zero torque magnetic transition zone; and
    reacquiring a position control loop upon an exit of said coil active length from said zero torque magnetic transition zone utilizing said acquired final position value.

2. The method of claim 1, by steps further comprising;
    acquiring a final velocity control loop value upon entry into said zero torque magnetic transition zone;
    maintaining said current control loop while ignoring velocity control loop values provided by said velocity control loop whilst said coil active length advances through said zero torque magnetic transition zone; and
    reacquiring a velocity control loop upon said exit of said coil active length from said zero torque magnetic transition zone utilizing said acquired final velocity value.

3. The method of claim 2, by steps further comprising:
    placing a lift tab of said load arm into a parked position, wherein said lift tab is supported by said load ramp; and
    positioning a bias feature adjacent an actuator motor magnet while placing the lift tab into said parked position.

4. A data storage device comprising:
    a basedeck;
    an actuator motor magnet supported by said basedeck and having a zero torque magnetic transition zone;
    an actuator assembly mounted to said basedeck, said actuator assembly supporting a coil active length communicating with said actuator motor magnet; and
    a printed circuit board assembly positioned adjacent the basedeck and supporting a controller communicating with the actuator assembly, wherein said controller is configured to acquire and save a final position value of a position control loop of said coil active length upon an entry of said coil active length into said zero torque magnetic transition zone, ignoring generated position control loop values whilst maintaining a current control loop of said coil active length during passage of said coil active length passes through said zero torque magnetic transition zone and reacquiring a position control loop upon an exit of said coil active length from said zero torque magnetic transition zone based of said saved final position value.

5. The data storage device of claim 4, further comprises
    a spindle motor secured to said basedeck and supporting a disc;
    a read/write head supported by said actuator assembly and configured for communication with said disc;
    a load ramp attached to said basedeck, adjacent said disc, and configured for receipt of said read/write heads, and in which said controller is further configured to acquire and save a final velocity value of a velocity control loop of said coil active length upon an entry of said coil active length into said zero torque magnetic transition zone, ignoring generated velocity control loop values whilst maintaining a current control loop of said coil active length during passage of said coil active length passes through said zero torque magnetic transition zone and reacquiring a velocity control loop upon an exit of said coil active length from said zero torque magnetic transition zone based on said saved final velocity value.

6. The data storage device as claimed in claim 5, in which said actuator assembly comprises:
    the actuator motor magnet supported by said basedeck;
    a bearing assembly disposed between said disc and said motor magnet, and engaging said basedeck;
    an actuator arm communicating with said bearing assembly and supporting a voice coil configured for communication with said actuator motor magnet; and
    a bias feature secured to said actuator arm and configured for communication with said motor magnet, wherein upon parking said read/write head onto said load ramp, said bias feature mitigates an unintentional movement of said read/write heads into adjacency with said disc.

7. The data storage device as claimed in claim 6, further comprising a pole piece disposed between said actuator motor magnet and said basedeck, wherein the pole piece provides a magnetically permeable flux path for a magnetic circuit interacting with said actuator coil to facilitate movement of said actuator arm about said bearing assembly.

8. The data storage device as claimed in claim 7, further comprising a spacer adjacent said actuator coil and secured to said basedeck, said spacer interacting with said pole piece and improving an efficiency of said magnetic circuit.

* * * * *